United States Patent [19]

Insolio

[11] 4,228,711
[45] Oct. 21, 1980

[54] SELF-CASTERING GLASS CUTTER AND COMPENSATING BI-DIRECTIONAL HEAD

[75] Inventor: Thomas A. Insolio, Bristol, Conn.

[73] Assignee: The Fletcher-Terry Company, Farmington, Conn.

[21] Appl. No.: 39,861

[22] Filed: May 17, 1979

[51] Int. Cl.³ .......................... B26D 3/08; C03B 33/10
[52] U.S. Cl. ........................................ 83/881; 83/578; 83/582; 83/886; 225/96
[58] Field of Search ................. 83/578, 881, 886, 879, 83/582; 225/2, 96.5, 96

[56] References Cited

U.S. PATENT DOCUMENTS

| | | | |
|---|---|---|---|
| 3,136,191 | 6/1964 | Madge | 83/886 |
| 3,280,676 | 10/1966 | Grzymislanwski | 83/881 |
| 3,742,793 | 7/1973 | Gray et al. | 83/881 |
| 3,821,910 | 7/1974 | Tjaden | 83/881 |
| 4,137,803 | 2/1979 | Goldinger | 83/881 |

*Primary Examiner*—Frank T. Yost
*Attorney, Agent, or Firm*—McCormick, Paulding & Huber

[57] ABSTRACT

A glass scoring head has pressure rollers which engage the glass on either side of the scoring wheel to compensate for variations of flatness in the glass, and the scoring wheel is pendulously supported so that it can score in one and an opposite direction without moving the head on the associated bridge structure. The means for so supporting the scoring wheel also includes novel means for rotating the pendulum support itself to permit scoring in mutually perpendicular directions, both of which directions are also reversible as a result of the pendulous mount.

6 Claims, 9 Drawing Figures

SELF-CASTERING GLASS CUTTER AND COMPENSATING BI-DIRECTIONAL HEAD

BACKGROUND OF INVENTION

This invention relates generally to compensating heads of the type used with a bridge structure provided above a table which supports the glass to be scored, and deals more specifically with a head having pressure rollers which follow the glass surface contour, and support structure for the scoring tool capable of compensating for variations in this contour. More particularly, this invention relates to a bi-directional scoring tool which permits scoring in one and an opposite direction, and the scoring head to be described also includes means for rotating the structure for supporting the scoring wheel between mututally perpendicular directions such that the support body of the head need not be removed from the bridge structure in order to score in at least four different mutually perpendicular directions.

Prior art glass scoring heads have been provided with the capability of accommodating variations in the flatness of the glass being scored, but generally such prior art cutting heads have employed the use of levers and adjustable springs in rather cumbersome structures of the type shown and described in U.S. Pat. No. 3,280,677 to Grzymislawski, and U.S. Pat. No. 4,098,155 issued to Insolio.

The general aim of the present invention is to provide a more compact compensating head for a glass cutter such that no projecting levers or the like are required, and which head utilizes fluid pressure to achieve the capability of retracting and extending both the cutting wheel and associated pressure rollers, with particular advantage being taken of the concept of providing a pendulously supported glass scoring wheel in a pillar post which may be generally similar to that described in my co-pending application entitled "Glass Cutter" filed Nov. 9, 1978 and assigned Ser. No. 959,329 now U.S. Pat. No. 4,201,104.

In addition to the general aim of the present invention, that is to provide a bi-directional glass cutter with a self-castering action achieved in one and an opposite direction in a glass scoring head of the compensating type, still another aim of the present invention is to provide in such a compensating head the capability of rotating the structure supporting the glass scoring wheel and the pressure rollers so that scoring can be achieved in mutually perpendicular directions, both of which directions have the self-castering feature mentioned previously, and therefor providing a compensating head which will permit scoring of glass in at least four different directions related to these mutually perpendicular lines of action.

In summary, a compensating head of the present invention is well adapted for use in scoring sheet glass laid flat on a table or the like, particularly when the surface of the glass to be scored may not be perfectly flat, or when the bridge structure upon which the head is mounted may itself deflect in different amounts dependent upon the distance between the head and the support for such bridge structure. The apparatus of the present invention preferably comprises a generally rectangular support body adapted for movement in a plane generally parallel to the glass to be scored somewhat similar to that described in a co-pending application entitled "Compensating Glass Scoring Head" Ser. No. 039,858 filed May 17, 1979. Whereas said application describes a rectangular support body adapted for being mounted in any one of four possible positions to a bridge structure or the like, the present invention obviates the need for alternatively mounting the support body in these four different positions, and instead provides suitable means for scoring glass in four different directions, related perpendicularly to one another as a result of the novel structure to be described. A piston means of annular configuration is reciprocably provided in the support body, and more particularly in a cylindrical cavity defined therein, being adapted for limited movement on a line oriented perpendicular to the plane of the glass to be scored. Biasing means is provided to urge the piston means toward the glass, and glass engaging pressure rollers are mounted on this piston means, one on either side of the glass scoring wheel. The glass scoring wheel is reciprocably mounted within the annular piston means on suitable support means such that it too is adapted for limited movement on the same line of action as that of the piston means. The glass scoring wheel support means includes holder means rotatable on this same line of action. A downwardly open slot in the holder has spaced inner stop surfaces at the upper boundary of the slot such that a pendulum, pivotally supported in the slot, is adapted to abut these stop surfaces to define limits for its pendulous movement and to define two distinct positions such that the castering action required in a glass scoring pillar post is required without reversing the direction of motion for the pillar post and its associated support structure. The pendulum is of course pivotally supported for movement on an axis which intersects the line of action referred to above, and the glass scoring wheel is provided in the lower end of the pendulum for rotating on an axis parallel to the pendulum axis. The cutting wheel axis will be spaced rearwardly of the pendulum axis, and the said line of action, as a result of rolling contact between the wheel and the glass to be scored. Spring biasing means acts between the annular piston means and the scoring wheel support means, which spring biasing means provides a force independent of vertical movement of the pressure rollers as they travel across the surface of the glass being scored. Further, the piston means is rotatably supported in the support body, and may be rotated through a predetermined angular displacement (preferably 90 degrees) to align the glass scoring wheel with the intended direction of motion of the support body with respect to the glass during a scoring operation. The mutually perpendicular positions for the glass scoring wheel can be adjusted with accuracy by means of adjustable stop screws acting on cams provided for this purpose in the support body. These cams are slidably received on the annular piston so as not to interfere with the reciprocating motion of the piston while the screws are threadably received in the support body itself.

DETAILED DESCRIPTION

Figure 1:
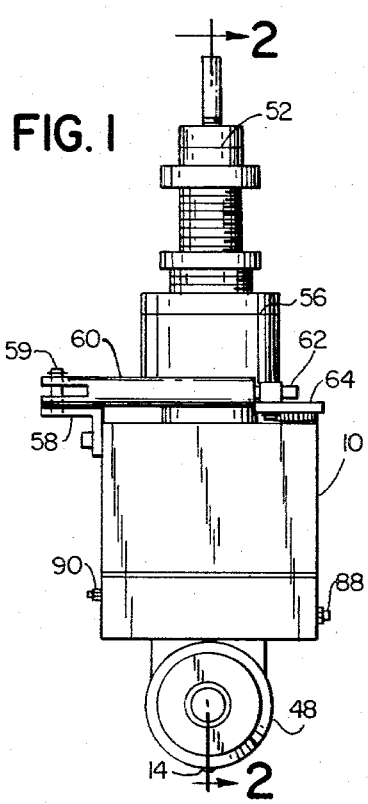
FIG. 1 is a side elevational view illustrating a compensating cutting head incorporating the present invention.

In machines for scoring sheet glass on a production basis, relatively large glass sheets are generally layed on a table or the like, with a bridge structure being provided thereabove to support a carriage or the like in which a scoring head such as that of the present invention is adapted to be mounted in order to permit the head to traverse the sheet in the desired direction for achieving a particular line of score. Alternatively, the glass sheet might be moved across beneath the head in order to provide the desired score line. The present disclosure relates to the scoring head itself, and in a typical installation the scoring head of FIG. 1 is provided with a support body 10 which is adapted to be mounted to such a bridge or carriage structure in order that relative motion can be provided between the scoring head and the glass sheet, as for example toward the left or right in FIG. 1.

Figure 7:
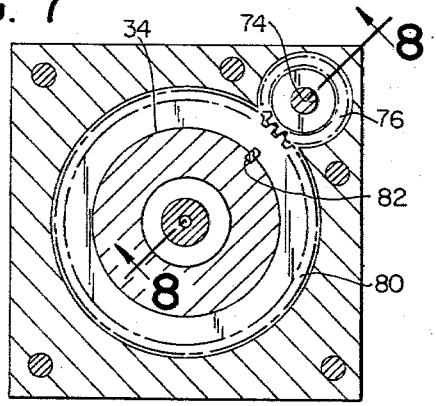
FIG. 7 is a horizontal sectional view taken generally on the line 7—7 of FIG. 2.
Figure 9:
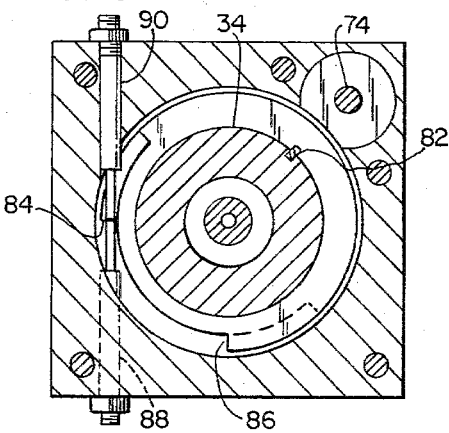
FIG. 9 is a horizontal sectional view taken generally on the line 9—9 of FIG. 2.

The body 10 preferably has a rectangular shape best shown in FIGS. 7 and 9 and may be mounted on any one of its four mutually perpendicular sides to the bridge or carriage structure (not shown) by conventional means. In the compensating head of the present invention the support body 10 is permanently mounted to such a bridge or carriage structure without any necessity for removal of the support body or for reorienting the support body itself in order to permit scoring of the glass in various mutually perpendicular directions. An important feature of the present invention relates to provision in the compensating head for moving the scoring wheel around a vertical axis defined in the support body itself so as to orient the glass scoring wheel in the desired direction of score. Further, the scoring wheel includes a pendulously supported intermediate member to permit scoring of the glass in one and an opposite direction without necessity for rotating the wheel on this axis in the support body.

The compensating head of the present invention is adapted to apply a constant downward force to the cutting wheel as the wheel rolls along the surface of the glass being scored, and this feature is of particular advantage in scoring relatively large sheets of glass due to the fact that the glass may have variations in its thickness or flatness, and also due to the fact that the table itself may not be flat, or the bridge structure upon which the head is mounted for traversing the glass may itself deflect in proportion to the distance of the head from the support for such bridge structure. It is characteristic of mechanical springs generally that the use of a single spring for exerting a downward force on the cutting wheel is not satisfactory for achieving a constant downward force on the cutting wheel because such a force will necessarily vary depending upon these variations or deflections. The compensating head to be described includes means for accommodating these variations in the position of the head relative to the glass being scored.

Figure 3:
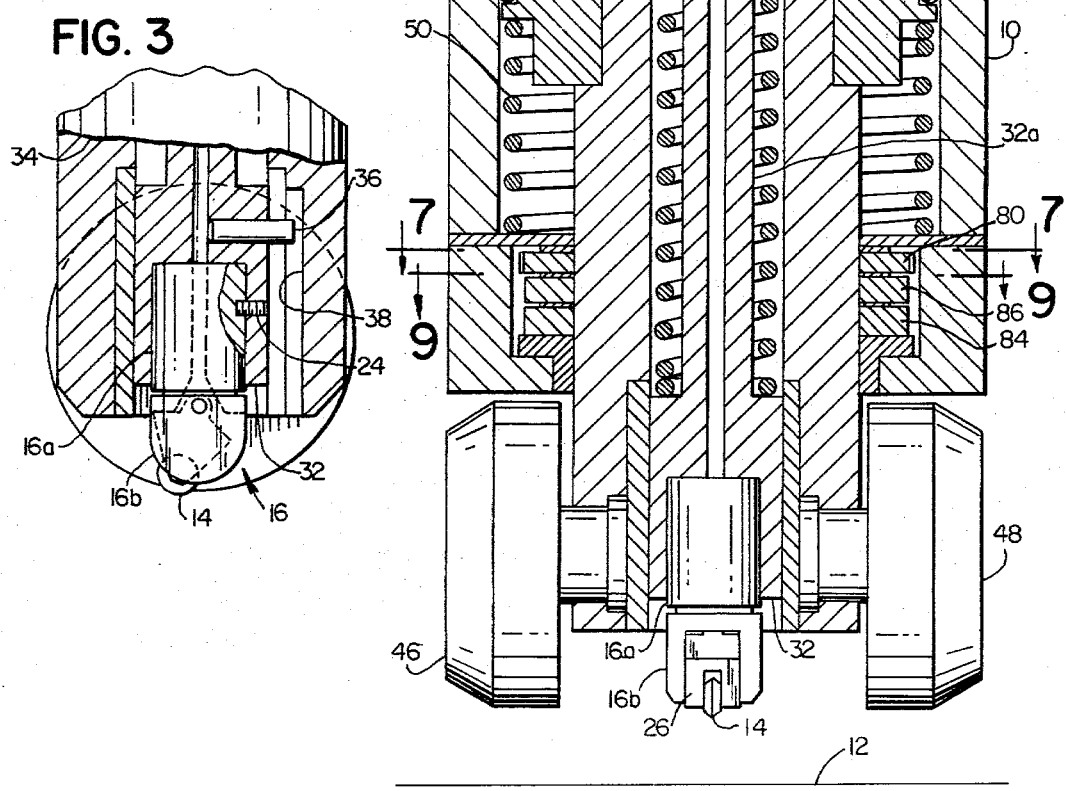
FIG. 3 is a detailed view illustrating in vertical section the lower portion of the head depicted in FIGS. 1 and 2.
Figure 2:
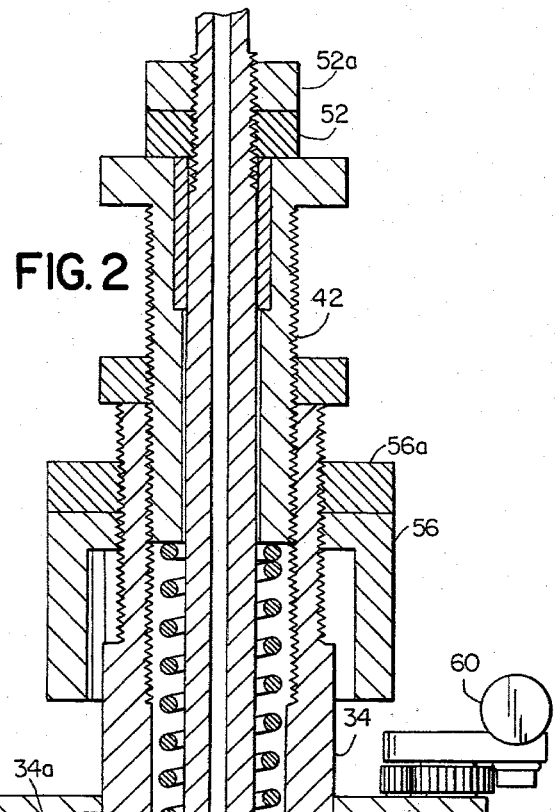
FIG. 2 is a longitudinal sectional view taken generally on the line 2—2 of FIG. 1 illustrating the head of FIG. 1 to a larger scale.
Figure 4:
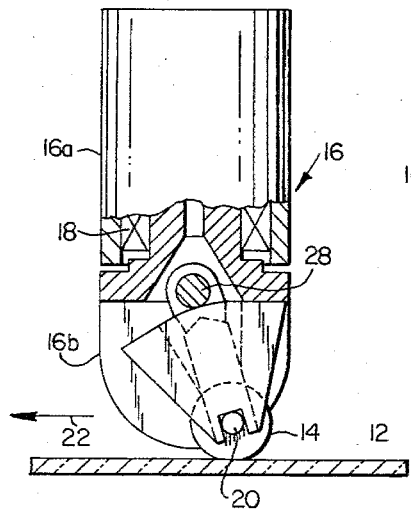
FIG. 4 is a detailed view of the pillar post mounted in the lower portion of the head by means of the set screw illustrated in FIG. 3 and showing the glass scoring wheel in position for scoring glass pursuant to relative motion between the two as indicated by the arrow.

With particular reference to the FIG. 2, the upper surface of the sheet glass to be scored is shown at 12, and the support body 10 is provided on a suitable bridge structure or the like (not shown) to permit the compensating head of FIG. 2 to traverse the glass sheet 12 with the glass scoring wheel 14 lowered from the position shown to the position illustrated in FIG. 4 by mechanism to be described. With particular reference to FIG. 4, the scoring wheel 14 is provided in a pillar post 16 and this pillar post includes an upper portion 16a which defines a bearing 18 such that the lower portion 16b of the pillar post is rotatable in the upper portion 16a in order to achieve a castering action for the scoring wheel 14 as a result of geometry for the axis of rotation of the wheel, defined by pin 20, and its location, rearwardly of the center line or axis of rotation of the bearing 18, with reference to the direction of motion 22 for the head as the glass sheet 12 is being scored. The upper portion 16a of the pillar post 16 is held in the lower end of a support stem to be described by a set screw 24, best shown in FIG. 3.

Figure 5:
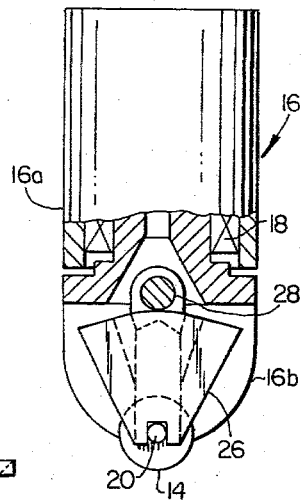
FIG. 5 is a view similar to FIG. 4 by illustrating the scoring wheel in a neutral position, that is without movement across the glass sheet to be scored.
Figure 6:
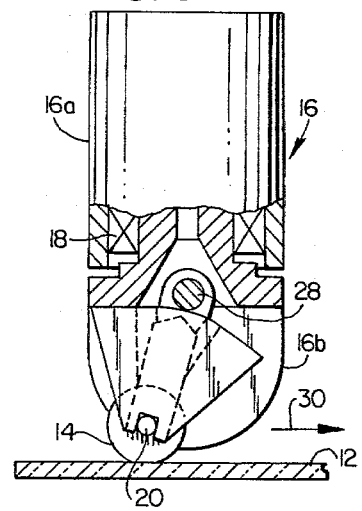
FIG. 6 is a view similar to FIG. 4 but illustrates the configuration for the cutting wheel in response to rolling contact between the wheel and the glass in the direction of the arrow as indicated.

The scoring wheel 14 is provided on axle 20, in a pendulum member 26, which member 26 is rotatably supported for pivotal movement on pin 28 provided for this purpose in the bifurcated portion 16b of the pillar post 16. The reader is referred to my co-pending application entitled "Glass Cutter" Ser. No. 959,329 filed on Nov. 9, 1978 for a detailed description of one possible embodiment for this pendulous member 26. The important feature of the pendulously supported scoring wheel 14 is that such scoring wheel is capable of scoring in one and an opposite direction as indicated generally by the arrows 22 and 30 in FIGS. 4 and 6 respectively, solely as a result of the fact that rolling contact between the wheel and the glass 12 will cause movement of the pendulum 26 from the neutral position shown in FIG. 5, to either that shown in FIG. 4 or FIG. 6 depending upon the direction of movement of the head. Stop surfaces are defined in the holder slot defined by the bifurcated lower portion 16b of the pillar post, which stop surfaces engage corresponding abutment surfaces on the pendulum member 26 in order to properly locate the scoring wheel 14 for the desired castering action referred to above.

The pillar post 16 is supported in the lower end of a support stem 32 by set screw 24 mentioned previously, and the stem 32 is itself circular in configuration but limited to reciprocating movement in an annular piston means 34 to be described. As best shown in FIG. 3 a pin 36 is provided in the lower end of the support stem 32 with the outer end of this pin 36 slidably received in a slot 38 provided for this purpose in the annular piston means 34.

Still with reference to the support stem 32, for the pillar post 16, FIG. 2 shows the support stem 32 as being of elongated configuration and having a central bore through which cutting fluid for the scoring wheel can be continuously fed. The elongated stem 32 also defines a tubular portion 32a around which is provided a coiled compression spring 40. The spring 40 acts between the lower end of the support stem 32 and the underside of a member 42 secured to the annular piston 34. More particularly the annular piston 34 is provided with an annular portion 34a which is slidably received in the cylindrical cavity 44 on the support body 10.

The annular piston 34 comprises an elongated member with a lower portion in which glass engaging pressure rollers 46 and 48 are journalled, a central portion 34a defining a fluid chamber in cooperation with the cylindrical portion of housing 10, and an upwardly extending or projecting portion which is secured to the member 42 against which the spring 40 acts to urge the support stem 32 and scoring wheel 14 downwardly with respect to such annular piston. As so constructed and arranged, the pressure wheels 46 and 48 can be continualy urged downwardly so as to cause engagement between the pressure wheels and the glass 12 as a result of applying pressure to the chamber defined by the cylinder 44 and piston 34a, overcoming the force of return spring 50. The spring 40 acts between this annular piston 34a and the scoring wheel support stem 32 to provide a constant force on the cutting wheel 14 urging it into engagement with the glass 12. This force will be independent of variations in the flatness of the glass, and/or due to deflections of the bridge structure in which the compensating head 10 is provided as mentioned previously.

A threaded nut 52 is provided on the upper end of support stem 32 as shown in FIG. 2 to provide a lower limit for the down position of the cutting wheel 14 with reference to the pressure rollers 46 and 48. Lock nut 52a serves to preserve the setting for the nut 52 and a cup-shaped nut 56 is also provided on the annular piston 32 in order to provide a down limit position for the pressure rollers themselves, and it too has a lock nut 56a for the same purpose, that is to preserve any preset adjustment in the nut 56.

In accordance with the present invention the scoring wheel 14 is not only capable of scoring in one and an opposite direction without upsetting the assembly of the support body 10 to its associated carriage or bridge structure, but means is also provided for rotating the annular piston 34 in the support body 10 between the position shown in FIG. 2 for example and a position oriented 90 degrees with respect thereto, with the result that movement of the bridge structure or carriage in which the head is provided can be selected in either an "X" or "Y" direction merely by rotating this piston means 34 by suitable means to be described.

Figure 8:
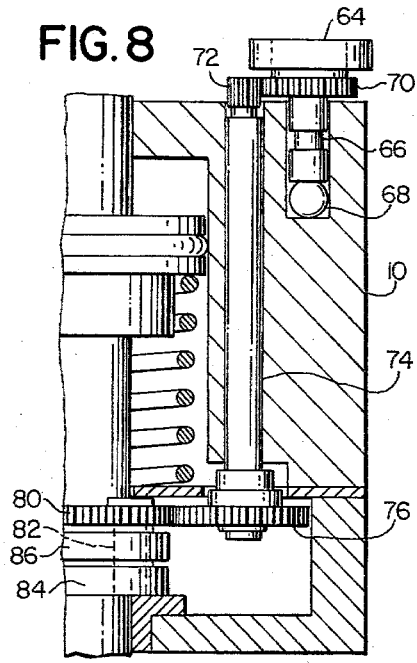
FIG. 8 is a vertical sectional view through a portion of the head illustrated in FIG. 2, being taken generally on the line 8—8 of FIG. 7.

With particular reference to FIG. 1, a bracket 58 is provided on the support body 10, which bracket has an upstanding pin 59 for pivotally receiving a fluid actuator 60, and more particularly for receiving the cylindrical housing of such an actuator, in order that the movable part of the fluid actuator 62 can operate a crank 64 through a predetermined angular displacement with reference to the center line or axis of a shaft best shown in FIG. 8 at 66. The shaft 66 is journalled in the housing 10 as shown in FIG. 8, and is supported at the lower end of the shaft 66 on a roller ball 68 to provide an antifriction bearing for the shaft 66. A small gear 70 is provided on the shaft 66 between the crank 64 and top of support body 10, as shown in FIG. 8. This gear 70 meshes with a smaller gear 72 provided at the upper end of a shaft 74, also journalled in the support body 10. With particular reference to FIG. 7, the shaft 74 has a somewhat larger gear 76 at its lower end, which gear 76 meshes with an annular gear 80, and the annular gear 80 is keyed to the annular piston 34 as shown at 82. Linear movement of the movable part 62 of fluid actuator 60 achieves rotation of the gear 80 and hence of the annular piston 34 through approximately at least 90 degrees, and the gear 80 is slidably received on the annular piston 34 so as not to interfere with vertical linear motion of the piston in the support body 10 as described previously.

Means is provided for precisely adjusting the limit positions for the annular piston 34 and preferably said means comprises annular cam stops 84 and 84 also slidably supported on the annular piston 34 by means of the elongated key 82, which cam stops define radially extending surfaces as best shown in FIG. 9 adapted to be engaged by adjustable stop screws 88 and 90, which screws are threadably received in openings provided for this purpose in the support body 10.

I claim:

1. Apparatus for scoring sheet glass, comprising a support body adapted for relative movement in a plane generally parallel to the glass to be scored, piston means in said support body and adapted for limited reciprocating movement on a line oriented perpendicular to said plane, biasing means to urge the piston means toward the glass, and glass engaging rollers on said piston means, glass scoring wheel support means reciprocably mounted in said piston means for limited movement on the same line of action as that of said piston means, biasing means acting between said piston means and said wheel support means, said glass scoring wheel support means including a holder means rotatable on said line of action and defining a downwardly open slot with spaced inner stop surface segments, a pendulum member pivotally supported in said slot on an axis intersecting said line of action at right angles and adapted for pendulous movement in said slot between limit positions determined by abutment with said stop surfaces, a glass scoring wheel provided in said pendulum member for rotation on an axis which is spaced rearwardly of said line of action to provide a castering action in one and an opposite direction, as a result of rolling contact between said wheel and the glass.

2. Apparatus according to claim 1 further characterized by said piston means rotatably supported in said support body, and means for rotating said piston means to align said glass scoring wheel with the direction of motion of said support body with respect to the glass.

3. Apparatus according to claim 2 wherein said means for rotating said piston means comprises a gear slidably and non-rotatably received on said piston means to permit reciprocating movement as aforesaid, said gear rotatably provided in said support body, and means for rotating both said gear and said piston means through at least 90 degrees in said support body.

4. Apparatus according to claim 3 wherein said means for rotating said gear through 90 degrees comprises a fluid motor with a movable part, and a crank and smaller gear both mounted on a crankshaft with the smaller gear in mesh with the gear on said piston means to provide for said at least 90 degrees angular movement of said piston means.

5. Apparatus according to claim 4 further characterized by at least one cam stop slidably and non-rotatably mounted on said piston means, and a adjustable stop screw threadably received in said support body for engagement with said cam stop to limit angular movement of said piston means in at least one direction.

6. Apparatus according to claim 4 further characterized by two annular cam stops arranged adjacent to said gear on said piston means for relative sliding movement with respect thereto, and adjustable stop screws associated with each cam stop and threadably received at spaced locations in said support body so that their respective ends are adapted to engage said cam stops to respectively limit angular movement of said piston means in both directions to precisely define the limits for said 90 degree movement of said piston means.

* * * * *